(12) United States Patent
Yamazaki

(10) Patent No.: US 8,781,734 B2
(45) Date of Patent: Jul. 15, 2014

(54) MAP DISPLAY DEVICE AND MAP DISPLAY METHOD

(75) Inventor: Noboru Yamazaki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1071 days.

(21) Appl. No.: 12/124,856

(22) Filed: May 21, 2008

(65) Prior Publication Data

US 2008/0306684 A1 Dec. 11, 2008

(30) Foreign Application Priority Data

Jun. 6, 2007 (JP) ................................. 2007-150115

(51) Int. Cl.
G01C 21/30 (2006.01)
G01C 21/32 (2006.01)

(52) U.S. Cl.
USPC ... 701/455; 701/532; 340/995.1; 340/995.11; 340/995.14; 340/995.15

(58) Field of Classification Search
USPC ............... 701/208, 212, 532, 455; 340/995.1, 340/995.11, 995.14, 995.15
See application file for complete search history.

(56) References Cited

U.S. PATENT DOCUMENTS

| | | | | |
|---|---|---|---|---|
| 4,608,656 A | * | 8/1986 | Tanaka et al. | 701/212 |
| 4,914,605 A | | 4/1990 | Loughmiller, Jr. et al. | |
| 5,528,501 A | * | 6/1996 | Hanson | 701/200 |
| 5,559,938 A | * | 9/1996 | Van Roekel et al. | 345/441 |
| 5,710,877 A | * | 1/1998 | Marimont et al. | 345/427 |
| 5,809,179 A | * | 9/1998 | Marimont et al. | 382/254 |
| 5,832,406 A | * | 11/1998 | Iwami et al. | 701/202 |
| 5,908,465 A | * | 6/1999 | Ito et al. | 701/532 |
| 5,917,436 A | * | 6/1999 | Endo et al. | 340/995.14 |
| 6,070,124 A | * | 5/2000 | Nimura et al. | 701/211 |
| 6,144,318 A | * | 11/2000 | Hayashi et al. | 340/995.19 |
| 6,178,380 B1 | * | 1/2001 | Millington | 701/212 |
| 6,324,467 B1 | * | 11/2001 | Machii et al. | 701/200 |
| 6,330,858 B1 | * | 12/2001 | McDonough et al. | 101/208 |
| 6,940,530 B2 | * | 9/2005 | Chen et al. | 345/660 |

(Continued)

FOREIGN PATENT DOCUMENTS

JP 2004-126036 4/2004

*Primary Examiner* — Khoi Tran
*Assistant Examiner* — Jaime Figueroa
(74) *Attorney, Agent, or Firm* — Brinks Gilson & Lione

(57) ABSTRACT

The invention provides a map display device and map display method that enhance the information density of displayed road names while maintaining legibility of a map image. First, the map drawing unit draws, to an image storage unit, a map image of roads and so forth in a desired scale, by using the background layer of a first hierarchy corresponding to the desired scale. Second, the map drawing unit draws place names and facility names by using the character layer of the first hierarchy to superimpose them on the map image. Third, the map drawing unit extracts the road names that do not overlap with the map characters of the place names and facility names on the map image by using the character layer of the first hierarchy, and superimposes them on the map image at the normal character size. Fourth, the map drawing unit extracts, by using the character layer of a second hierarchy corresponding to a scale level smaller by one step than the desired scale level, road names that do not overlap with the map characters of the other road names, place names, facility names and so forth on the map image, and superimposes them on the map image at a smaller character size. Finally, the map drawing unit superimposes the vehicle position mark on the map image.

18 Claims, 9 Drawing Sheets

(56) References Cited

U.S. PATENT DOCUMENTS

| | | |
|---|---|---|
| 7,430,473 B2 * | 9/2008 | Foo et al. ................... 701/212 |
| 7,542,882 B2 * | 6/2009 | Agrawala et al. ............. 703/2 |
| 2005/0149303 A1 * | 7/2005 | Agrawala et al. ............. 703/2 |
| 2005/0182604 A1 * | 8/2005 | Agrawala et al. ............. 703/2 |
| 2005/0182605 A1 * | 8/2005 | Agrawala et al. ............. 703/2 |
| 2005/0187711 A1 * | 8/2005 | Agrawala et al. ............. 701/211 |
| 2006/0106534 A1 * | 5/2006 | Kawamata et al. ........... 701/208 |
| 2006/0155462 A1 | 7/2006 | Sumizawa et al. |
| 2006/0174209 A1 * | 8/2006 | Barros ....................... 715/764 |
| 2006/0279432 A1 * | 12/2006 | Mori ......................... 340/990 |
| 2006/0284738 A1 * | 12/2006 | Mori ....................... 340/995.14 |
| 2007/0143014 A1 * | 6/2007 | Sekine et al. ................ 701/211 |

\* cited by examiner

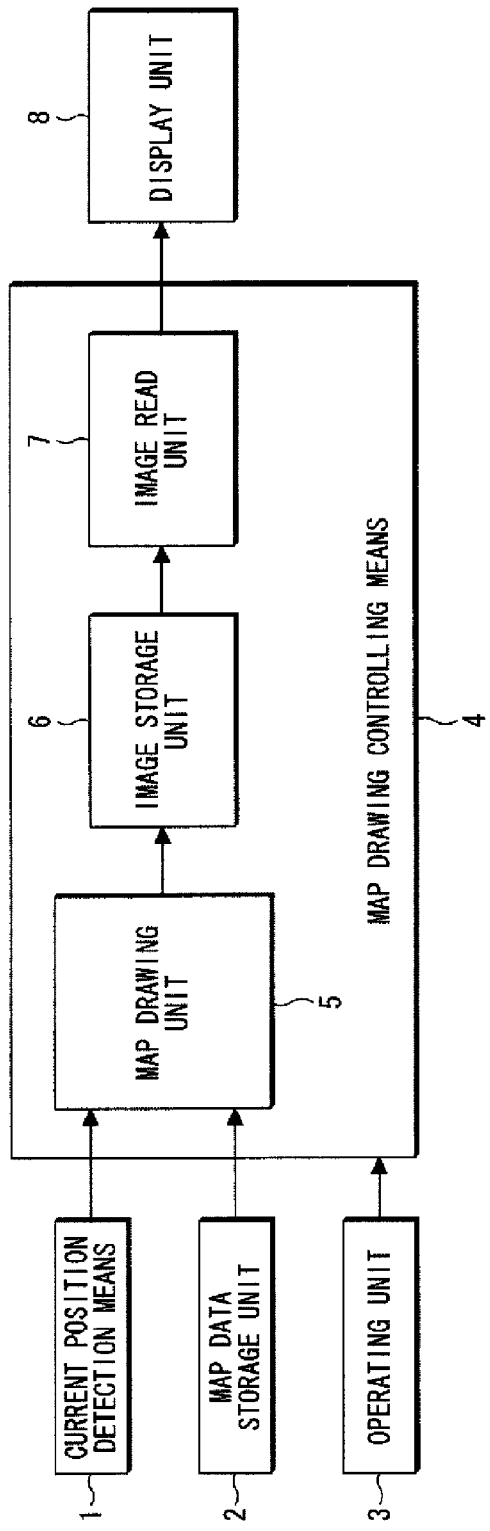
FIG.7 PRIOR CONSTRUCTON OF ON-VEHICLE NAVIGATION SYSTEM

MAP DISPLAY DEVICE AND MAP DISPLAY METHOD

RELATED APPLICATION

The present application claims priority to Japanese Patent Application Number 2007-150115, filed Jun. 6, 2007, the entirety of which is hereby incorporated by reference.

FIELD OF THE INVENTION

The present invention relates to a map display device and a map display method, specifically to a map display device and a map display method for displaying map images including road names.

DESCRIPTION OF THE RELATED ART

In a map display device such as an on-vehicle navigation system and a portable navigation system, the map data for drawing map images are classified into plural hierarchy levels according to the scale sizes, and the larger the scale is, the more detailed a map can be displayed (refer to FIG. 6). The map data of each hierarchy includes a background layer for drawing roads, rivers, parks, and so forth; and a character layer (map character data) for drawing road names, place names such as city names, plural items of facility names, and so forth by means of map characters. The information of the character layer includes, for example, the item classifications of road names, place names, facility names, display position coordinates, display directions, and character code strings. The road names are drawn in a direction along the corresponding roads. The names of places, facilities, and so forth other than the road names are drawn laterally on the image screen. The roads (road links) and road names as address information are highly useful and should be properly presented for display.

FIG. 7 is a block diagram illustrating the construction of a conventional on-vehicle navigation system, wherein a current position detection means 1 detects the current position and current direction of a vehicle. A map data storage unit 2 stores the map data classified into plural hierarchy levels according to the scale sizes. When an operating unit 3 designates a certain scale and the north-up display mode, a map drawing unit 5 of a map drawing controlling means 4 draws a map image heading north up in the desired scale by using a background layer of a hierarchy level corresponding to the scale, and outputs it to an image storage unit 6. The map drawing unit 5 simultaneously superimposes the map characters of names of the roads, places, facilities, and so forth on the map image by using a character layer of the hierarchy level corresponding to the scale. Further, the map drawing unit 5 superimposes a vehicle position mark pointing in the current traveling direction on a place corresponding to the current vehicle position. The image from the image storage unit 6 is read out by an image read unit 7 and converted into a video signal. The signal is then output to a display unit 8 to be displayed on a screen. As shown in FIG. 8(a), the road name is drawn with a predetermined character size and normal character pattern along a corresponding road RD from a display position coordinate P. As shown in FIG. 8(b), the map character of the names of places, facilities, and so forth other than the road names are drawn with the predetermined character size and normal character pattern laterally (horizontally) on the image from the display position coordinate P.

When the heading-up display mode is designated through the operating unit 3, a map image is drawn to be output to an image storage unit 6 by the map drawing unit 5 of the map drawing controlling means 4 with the heading of the current vehicle direction up, together with the map characters of the road names, etc. and the vehicle position mark. Here, each road name is drawn along the corresponding road RD, and the names of places and facilities are drawn laterally on the image.

In the heading-up display mode, the road name can be drawn for good legibility by using the character row pattern with the size corresponding to a current vehicle azimuth measured clockwise with respect to the north, which is the reference direction, as shown with the road RD in FIG. 8(c). Note that, when the road name is drawn in this way, a larger character size and thereby a longer entire length LH of the road name characters are needed, compared to the length LN in FIG. 8(a).

If all the road names of roads having names are drawn, there would be too many characters on the map image, especially in city areas, to easily perceive the map image (FIG. 9(a)). However, reducing the character size would have an adverse effect on the legibility of the drawn road names. As one solution, the conventional technique decreases the density of the road names in the character layer of each hierarchy in advance, or deletes many names of places, facilities, and so forth overlapping with other names in the character layer of a desired hierarchy level. As a result, the fewer road names drawn on the map image provide insufficient address information density (FIG. 9(b)).

In the heading-up display mode, the road names may overlap with the names of places, facilities, and so forth drawn laterally and may be omitted, resulting in even fewer road names displayed on the map image. Especially, the aforementioned angled character row pattern for higher legibility as shown in FIG. 8(c), which needs more space (refer to the lengths LN, LH in FIG. 8(a), 8(c)), more likely overlaps with the other names of places, facilities, and so forth.

The conventional on-vehicle navigation system according to Japanese Published Patent Application No. 2004-126036 controls the character density on an image by assigning a priority to the road types in the order of highways, national roads, and prefectural roads, and limiting the road names on an image to a predetermined number, in order to reduce the overlapping. However, the reduction in the predetermined number for higher legibility of the map image disadvantageously decreases the road name information density.

SUMMARY OF THE INVENTION

The present invention has been made in view of the problems with the above conventional technique, and provides a map display device and a map display method which enhance the information density of the road names without decreasing legibility.

(Map Display Method)

One embodiment of the invention provides a map display method that, by using map data provided respectively for each of plural hierarchies corresponding to plural scales and map character data including road names, generates and displays a map image with map characters including the road names of a desired scale. This map display method includes drawing the map image having the map characters including the road names of a predetermined character size of a first hierarchy by using the map data of the first hierarchy corresponding to the desired scale; and adding the road names of a second hierarchy with a smaller character size than the road names of the first hierarchy on the map image, by using the map character data of the second hierarchy whose scale is larger by one step than the first hierarchy.

In the map display method, if a road name of the first hierarchy overlaps with other road names of the first hierarchy on the map image, the road name is not drawn; and if a road name of the second hierarchy overlaps with other road names of the second hierarchy on the map image, the road name is not drawn.

The map display method may include checking whether or not road names of the second hierarchy overlap the road names of the first hierarchy on the map image, and not drawing a road name of the second hierarchy if there is a road name overlap. In this case, alternatively, where the road names of the first and second hierarchies overlap, one of the parts may be drawn in a superimposed manner on the other with transparent characters.

The map display method may include checking whether or not there is a road name of the second hierarchy on the map image that coincides with any road name of the first hierarchy, and not drawing the road name of the second hierarchy if there is.

The map display method may include the following three steps: including one or more items such as the names of places or facilities in addition to the road names in the map character data of each hierarchy; checking whether or not a road name of the first hierarchy overlaps on the map image with a map character other than the road names of the first hierarchy, when displaying the map image, to avoid drawing the road name if there is overlap; and checking whether or not a road name of the second hierarchy overlaps on the map image with a map character other than the road names of the first hierarchy, to avoid drawing the road name if there is overlap. Note that, in the case of drawing the map image with a rotation of the upward direction on the image by a given degree of azimuth with respect to a predetermined reference direction, the map characters of all or a part of the items other than the road names of the first hierarchy are laterally drawn without any other alteration. Further, in the case of drawing the map image with a rotation of the upward direction on the image by a given degree of the angle with respect to the predetermined reference direction, the road names of the first and second hierarchies are drawn by using the character patterns inclining by the degree of the angle.

(Map Display Device)

Another embodiment of the invention provides a map display device that displays a map image of the area near a vehicle position. The map display device includes a map data storage unit that stores map data provided for each of plural hierarchies corresponding to plural scales and has map character data including road names; and a map drawing controlling means that generates a map image comprising map characters including the road names of a desired scale by using the map data, to be displayed on a display unit. The map drawing controlling means draws the map image having the map characters including the road names of a predetermined character size of a first hierarchy by using the map data of the first hierarchy corresponding to the desired scale; and adds the road names of a second hierarchy with a smaller character size than the road names of the first hierarchy on the map image, by using the map character data of the second hierarchy whose scale is larger by one step than the first hierarchy. The map drawing controlling means avoids drawing the road name if a road name of the first hierarchy overlaps with other road names of the first hierarchy on the map image, and avoids drawing the road name if a road name of the second hierarchy overlaps with other road names of the second hierarchy on the map image.

The map drawing controlling means checks whether or not road names of the second hierarchy overlap with road names of the first hierarchy on the map image, and if there is a road name overlap, the means avoids drawing the road name of the second hierarchy. In this case, alternatively, the map drawing controlling means may draw one of the overlapped parts and superimpose the other part with transparent characters.

The map drawing controlling means checks whether or not there is a road name of the second hierarchy on the map image that coincides with any road name of the first hierarchy, and if there is, it avoids drawing the road name of the second hierarchy.

The map display device may comprise at least one item such as place names or facility names in addition to the road names within the map character data contained in the map data of each hierarchy of the map data storage unit. In this case, the map drawing controlling means, when displaying the map image, also checks whether or not a road name of the first hierarchy overlaps on the map image with a map character other than the road names of the first hierarchy, and avoids drawing the road name if it overlaps; and checks whether or not a road name of the second hierarchy overlaps on the map image with a map character other than the road names of the first hierarchy, and does not draw the road name if it overlaps. Note that, in the case of drawing the map image with a rotation of the upward direction on the image by a given degree of angle with respect to a predetermined reference direction, the map drawing controlling means draws the map characters of all or part of the items other than the road names of the first hierarchy laterally without any other alteration. In the case of drawing the map image with a rotation of the upward direction on the image by a given degree of angle with respect to a predetermined reference direction, the map drawing controlling means draws the road names of the first and second hierarchies by using the normal character patterns with the rotated angle.

According to the above embodiment, the road names of the first hierarchy corresponding to a desired scale are displayed together with the road names of the second hierarchy corresponding to the scale more detailed by one step than the desired scale, and thereby the display density of the road names is enhanced and sufficient address information can be presented to a user. Further, the road names of the second hierarchy are displayed with a smaller character size than the road names of the first hierarchy, which leads to improved legibility of the map.

According to the embodiment, when a road name of the first hierarchy overlaps on the map image with other road names of the first hierarchy, the road name is not drawn; and when a road name of the second hierarchy overlaps on the map image with other road names of the second hierarchy, the road name is not drawn. As a result, improved legibility of the characters and the map are attained.

According to one embodiment, when a road name of the second hierarchy overlaps on the map image with any road name of the first hierarchy, the road name of the second hierarchy is not drawn; and thereby improved legibility of the characters and map can be attained.

According to one embodiment, when there is a road name of the second hierarchy on the map image that coincides with any road name of the first hierarchy, the road name of the second hierarchy is not drawn. As a result, duplicated road name display is avoided on the map image, which leads to improved legibility of the characters and map.

According to one embodiment, when the map image is displayed in a rotated state by the heading-up display mode, for example; if a road name of the first hierarchy overlaps on the map image with a map character other than the road names of the first hierarchy, the road name is not drawn, and if a road name of the second hierarchy overlaps on the map image with a map character other than the road names of the first hierarchy, the road name is not drawn. As a result, improved legibility of the characters and map can be attained.

BRIEF DESCRIPTION OF THE DRAWINGS

FIG. 7 is a block diagram illustrating the construction of a conventional on-vehicle navigation system;

DETAILED DESCRIPTION OF THE PREFERRED EMBODIMENTS

First Embodiment

Figure 1:
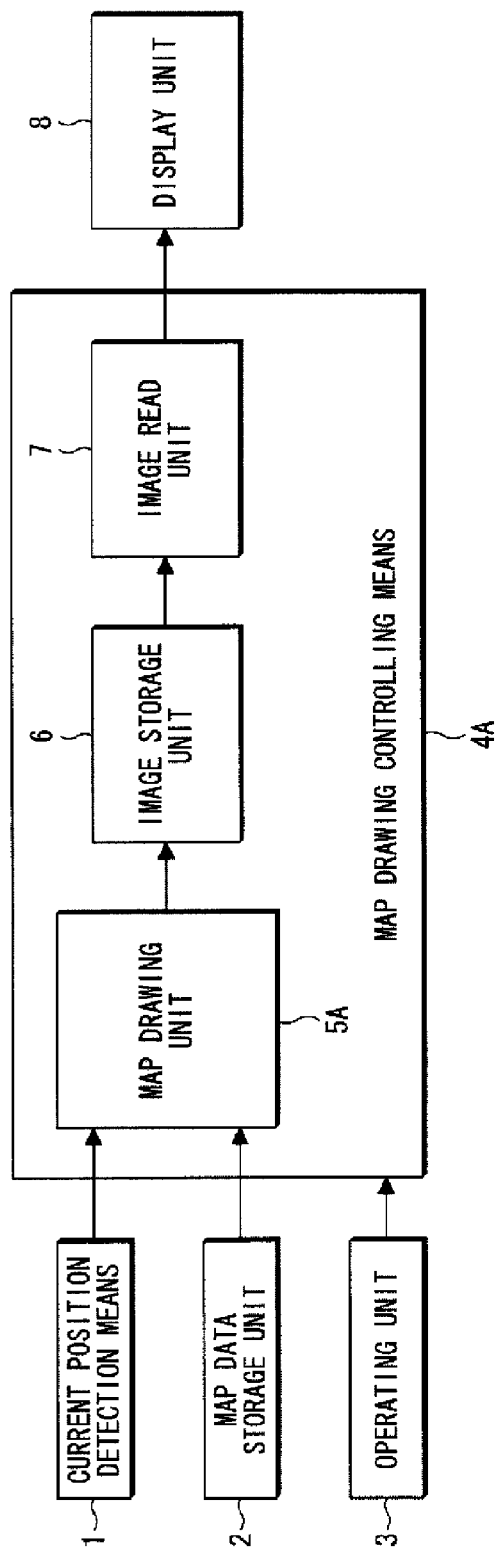
FIG. 1 is a block diagram illustrating the construction of an on-vehicle navigation system that embodies the map display method according to the present invention.

The first embodiment of the present invention will be described with reference to FIG. 1. FIG. 1 is a block diagram illustrating the construction of an on-vehicle navigation system that embodies the map display method according to the present invention, in which like components are given like numerals as in FIG. 7.

Figure 6:
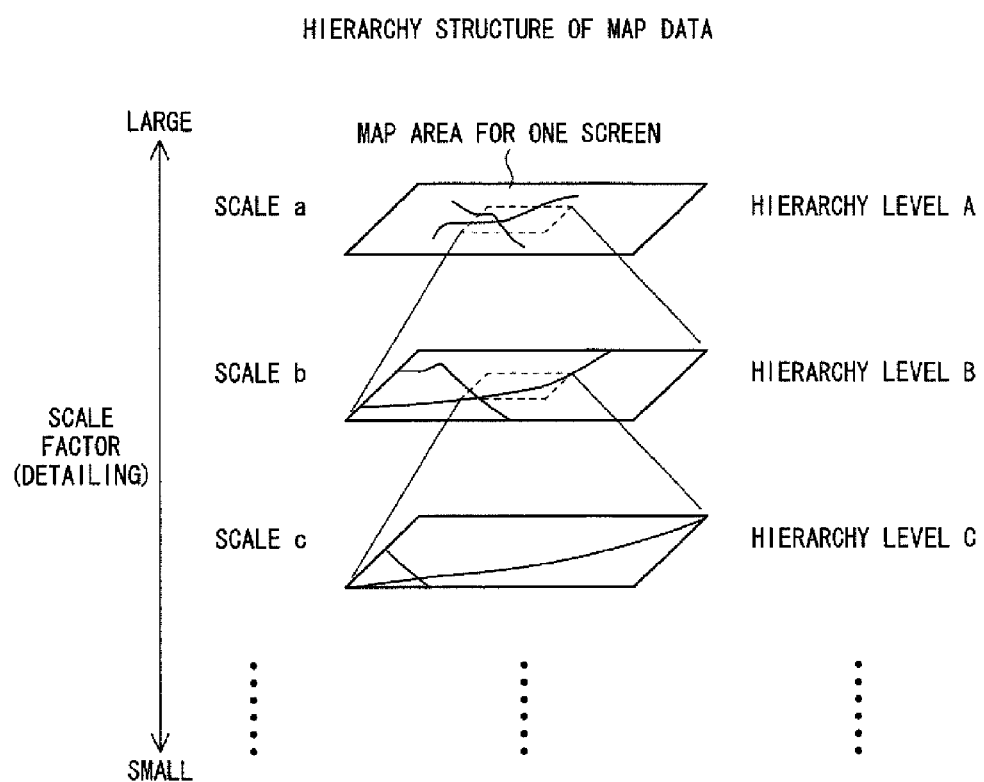
FIG. 6 illustrates the hierarchical structure of the map data.

In FIG. 1, the numeral 1 represents a current position detection means that periodically detects a current position and direction of the vehicle by using satellite navigation and dead reckoning navigation in combination. The numeral 2 denotes a map data storage unit that stores map data used for drawing a map image, and the map data are classified into plural hierarchy levels corresponding to scale sizes, in an order that the larger the scale is, the more detailed a map can be displayed (refer to FIG. 6).

The map data of each hierarchy include a background layer for drawing roads, rivers, parks and so forth, and a character layer for drawing the map characters of plural items of road names, place names, facility names and so forth. The information for each map character in the character layer may include: (a) item types of road names, place names, facility names and so forth, (b) coordinates at display positions, (c) display directions, and (d) character code strings. The road names are drawn in a direction along their corresponding roads. The place names and facility names are displayed laterally on the image.

The numeral 3 denotes an operating unit that changes the scale, switches the display mode between the north-up display mode and heading-up display mode, and so forth. The numeral 4A denotes a map drawing controlling means that draws a map image showing the area near the current vehicle position at a desired scale together with map characters, which is displayed on the display unit 8.

The map drawing process is now described. A map drawing unit 5A draws, to an image storage unit 6, a map image of roads, rivers, parks and so forth of a desired scale, by using the background layer of a hierarchy (hereinafter "the first hierarchy") corresponding to the desired scale (i.e., the designated scale). Next, the map drawing unit 5A draws the map characters of the place names, facility names and so forth other than the road names with a normal character size, by using the character layer of the first hierarchy, and superimposes them on the map image. Next, the map drawing unit 5A extracts the road names that do not overlap with the map characters of the place names, facility names and so forth on the map image and that do not overlap with other road names of the first hierarchy on the map image, by using the character layer of the first hierarchy; and superimposes them on the map image at the normal character size. Further, the map drawing unit 5A extracts, by using the character layer of another hierarchy (hereinafter "the second hierarchy") corresponding to a scale level larger by one step than the desired scale, the road names that do not overlap with the map characters of the road names, place names, facility names and so forth of the first hierarchy on the map image and that do not overlap with other road names of the second hierarchy on the map image; and superimposes them on the map image with a smaller character size than the normal character size. Finally, the map drawing unit 5A superimposes the vehicle position mark on the map image.

Figure 8A:
FIG. 8 illustrates methods of drawing the map characters.
Figure 8B:
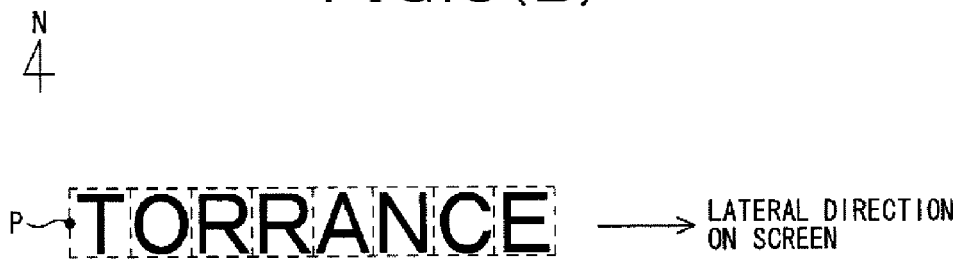

Specifically, in order to enhance the legibility of the place names and facility names other than the road names, the map drawing unit 5A, converting the character code strings into the normal character size and character pattern, draws them closely laterally along the roads from their display position coordinates (refer to FIG. 8(a)). As for the road names of the first hierarchy, the map drawing unit 5A, converting the character code strings into the normal character size and character pattern, puts them closely laterally along the roads (refer to FIG. 8(b)). As for the road names of the second hierarchy, the map drawing unit 5A, converting the character code strings into the character pattern of a smaller size than normal, draws them closely laterally along the roads. And in the case where the road names, place names, and so forth overlap, the map drawing unit 5A omits the display of one or the other according to their priority.

Figure 2:
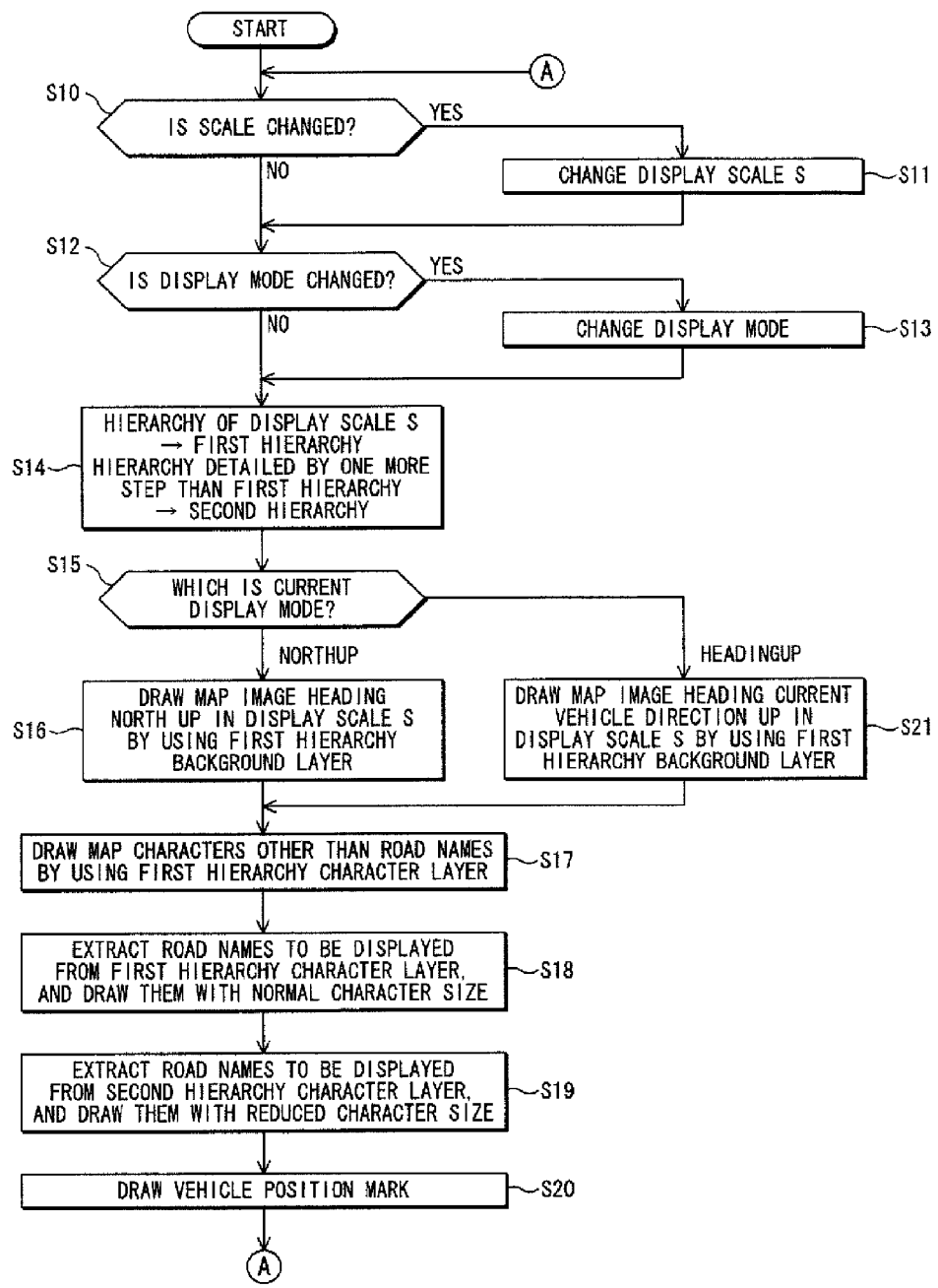
FIG. 2 is a flow chart illustrating the map drawing processing by the map drawing unit in FIG. 1.
Figure 3:
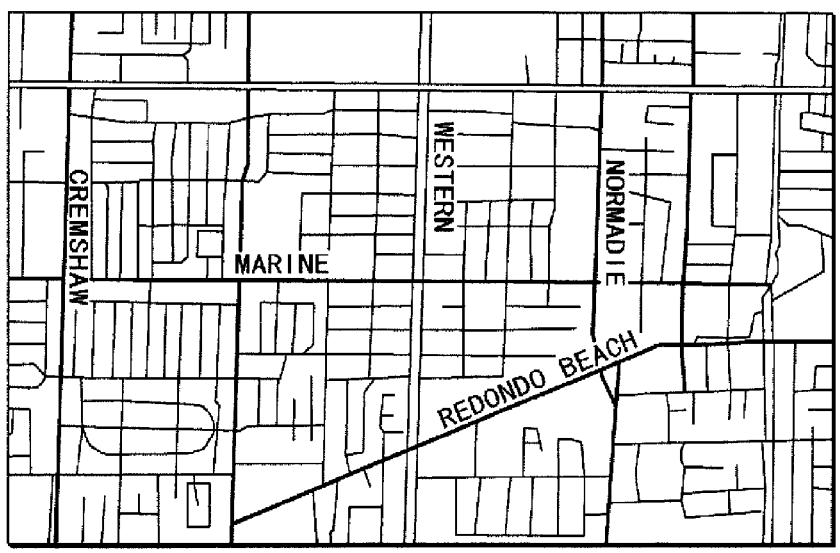
FIG. 3 illustrates the method of drawing road names of the first hierarchy.
Figure 4:
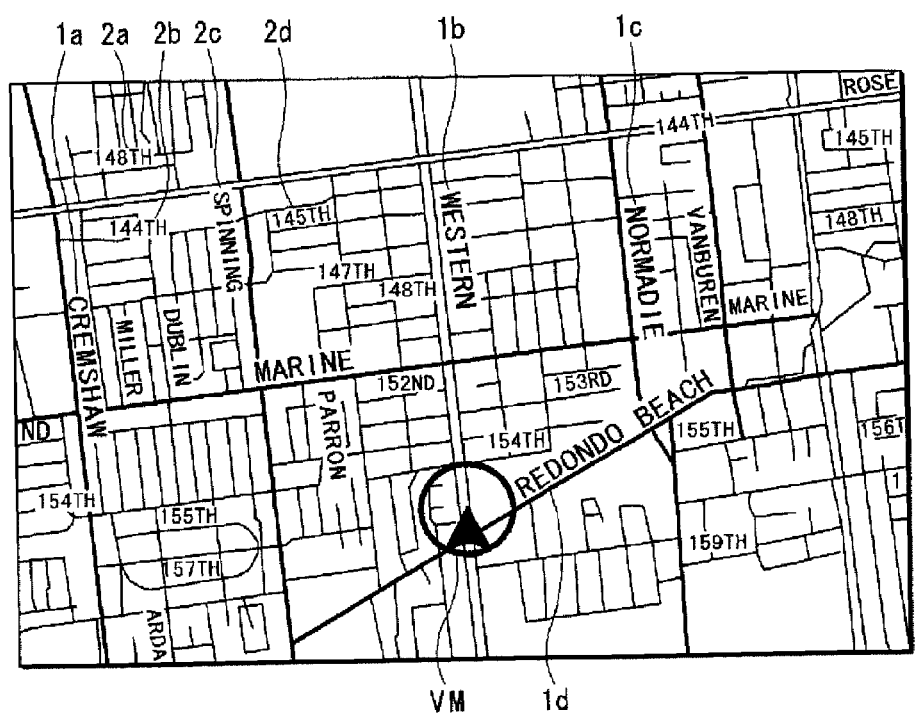
FIG. 4 illustrates a map image displayed in the north-up display mode.
Figure 5:
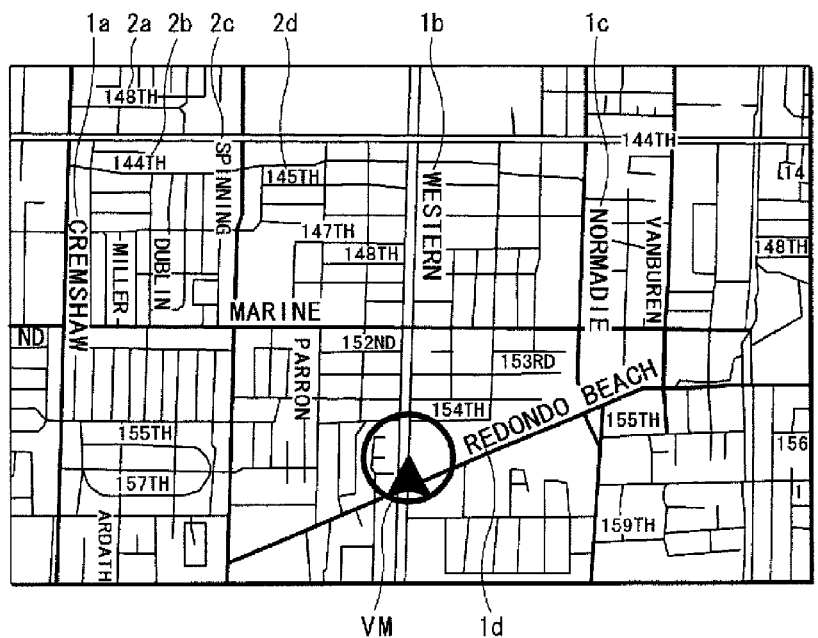
FIG. 5 illustrates a map image displayed in the heading-up display mode.

FIG. 2 is a flow chart of the process of drawing a map image with map characters including the road names, performed by the map drawing unit. FIG. 3 illustrates the method of drawing the road names of the first hierarchy. FIG. 4 illustrates a map image displayed in the north-up display mode. FIG. 5 illustrates a map image displayed in the heading-up display mode. The operation of the above embodiment will now be described with reference to these drawings.

(a) North-Up Display Mode

If a user reduces the scale by one step through the operating unit 3, the map drawing unit 5A reduces the display scale S by one step (steps S10, S11 in FIG. 2). If the user designates the north-up display mode, the map drawing unit 5A switches the display mode into the north-up display mode (steps S12, S13). The map drawing unit 5A, by using the background layer of the map data of the first hierarchy corresponding to a desired scale (display scale S) stored in the map data storage unit 2, draws to the map storage unit 6 a map image including roads, rivers, parks, and so forth surrounding the current vehicle position, with the desired scale and with north set upward (step S14 through step S16). Next, by using the character layer of the first hierarchy, the map drawing unit 5A draws the map characters of the place names, facility names, and so forth (other than the road names) at the normal character size to superimpose them laterally on the map image (step S17). Next, by using the character layer of the first hierarchy, the map drawing unit 5A extracts the road names that do not overlap with the map characters of other road names (here, the road names of the first hierarchy), place names, and facility names on the map image, and superimposes them on the map image at the normal character size (step S18, drawing of the road names of the first hierarchy, refer to FIG. 3). Here, if the information on the road names of the character layer of the first hierarchy contains the road types such as highway, national road, and local road, the map drawing unit 5A may extract the road names in order of priority of the road types. When the road names overlap in the above processing, the map drawing unit 5A may preferentially display the road name already displayed, or otherwise as desired.

Thereafter, using the character layer of the second hierarchy corresponding to the scale larger by one step than the desired scale S, the map drawing unit 5A extracts road names that do not overlap with the map characters of other road names (here, the road names of the first hierarchy and the road names of the second hierarchy), place names, and facility names on the map image and that do not coincide with the road names of the first hierarchy on the map image, and superimposes them on the map image at a smaller character size than the normal character size (step S19, drawing of the road names of the second hierarchy). Also, if the information on the road names of the character layer of the second hierarchy contains the road types such as highway, national road, and local road, the map drawing unit 5A may extract the road names in order of priority of the road types. The road names of the first and second hierarchies are drawn in the direction along their corresponding roads. Finally, the map drawing unit 5A superimposes the vehicle position mark VM on a location corresponding to the current vehicle position on the map image (step S20).

The map image with the map characters and the vehicle position mark drawn into the map storage unit 6 is read out by the image read unit 7. The image is converted into a video signal, and the resultant signal is output to the display unit 8 to be displayed. Thereafter, the map drawing unit 5A returns to step S10. While the user does not make any operations, the map drawing unit 5A repeats the same processing as above.

As shown in FIG. 4, the map image of the desired scale displayed in the north-up display mode has the road names of the first hierarchy (see the numerals 1a, 1b, 1c) displayed at the normal size. Regarding the road names of the first hierarchy, even if the information density of the character layer is high, the number of the road names displayed is limited in order not to overlap with the other road names, place names, and facility names of the first hierarchy on the map image, which leads to improved legibility including the roads, rivers, and parks, etc. Being displayed at the normal size without overlapping, the legibility of the road names of the first hierarchy is retained. Further, the map image of the desired scale S has the road names of the second hierarchy added thereon at a smaller size (see the numerals 2a, 2b, 2c). Therefore, the information density of the road names is enhanced, and more address information can be presented to the user. Regarding the road names of the second hierarchy, even if the information density of the character layer is high, the number of the road names displayed is limited in order not to overlap with the other road names, place names, and facility names of the first and second hierarchies on the map image, or duplicate the same road names as those of the first hierarchy, and are displayed at a smaller size, which facilitates the legibility of the map image including the roads, rivers, and parks and so forth. In addition, the place names and facility names do not interfere with the road names of the first and second hierarchies.

(b) Changing the Scale Level

When the user changes the operation to make the scale larger by one step (i.e., expansion operation) through the operating unit 3, the map drawing unit 5A changes the display scale S according to the operation (step S10, S11). Then a hierarchy corresponding to the new scale desired by the user (i.e., the second hierarchy until then) is set as a new first hierarchy, and a hierarchy more detailed by one step than the new first hierarchy is set as a new second hierarchy. The map image of the scale desired by the user is drawn by using the background layer of the new first hierarchy as described above. By using the character layer of the first hierarchy, the place names, facility names and so forth and the road names of the first hierarchy are drawn at the normal character size. Further, the road names of the new second hierarchy are additionally drawn with a smaller character size by using the character layer of the second hierarchy, and finally the vehicle position mark is superimposed (step S14 through step S20). As a result, on the map image enlarged by one step, the road names are displayed at the normal character size at the same positions as before the scale level change, but the road names are displayed with a smaller size.

When the user changes the operation to make the scale smaller by one step (i.e., reduction operation) through the operating unit 3, on the other hand, the map drawing unit 5A changes the display scale S according to the operation (step S10, S11). Then a hierarchy corresponding to the new scale desired by the user is set as a new first hierarchy, and a hierarchy more detailed by one step than the new first hierarchy (the previous first hierarchy) is set as a new second hierarchy. The map image of the scale desired by the user is drawn by using the background layer of the new first hierarchy as described above. By using the character layer of the first hierarchy, the place names, facility names and so forth and the road names of the first hierarchy are drawn at the normal character size. Further, the road names of the new second hierarchy are additionally drawn with a smaller character size by using the character layer of the second hierarchy, and finally the vehicle position mark is superimposed (step S14 through step S20). As a result, on the map image reduced by one step, the road names are displayed with the smaller character size at the same positions as before the scale level change, but the road names are displayed with a normal size.

Since road names are displayed at the same positions on the map image regardless of scale changing operation, map perception in a new scale can be facilitated by the road name correspondence before and after the scale changing operation.

(c) Heading-Up Display Mode

If the user performs the switching operation into the heading-up display mode through the operating unit 3, the map drawing unit 5A switches the display mode into the heading-up display mode (step S12, S13). Then using the background layer contained in the map data of the first hierarchy corresponding to the desired scale level (i.e., current display scale level) stored in the map data storage unit 2, the map drawing unit 5A draws to the image storage unit 6 the map image including the current vehicle position, roads, rivers, and parks setting the vehicle direction upward, at the desired scale level. Next, using the character layer of the first hierarchy, the map drawing unit 5A draws the map characters of the place names, facility names and so forth other than the road names at the normal character size laterally to superimpose them on the map image. Next, using the character layer of the first hierarchy, the map drawing unit 5A extracts the road names that do not overlap with the map characters of other road names (here, the road names of the first hierarchy), place names, and facility names, and draws them at the normal character size to superimpose them on the map image along the roads (drawing of the road names of the first hierarchy). Further, using the character layer of the second hierarchy corresponding to the scale level smaller by one step than the desired scale, the map drawing unit 5A extracts the road names that do not overlap with the map characters of the other road names (here, the road names of the first hierarchy and the second hierarchy), place names, and facility names and so forth on the map image and do not duplicate the road names of the first hierarchy on the map image, and superimposes them on the map image with a smaller character size than the normal character size. The road names of the first and second hierarchies are drawn in the direction along the roads. Finally, the map drawing unit 5A superimposes the vehicle position mark VM pointing in the current direction, on a location corresponding to the current vehicle position on the map image (step S14 through step S20).

The map image with the map characters and the vehicle position mark drawn into the map storage unit 6 is read out by the image read unit 7, which converts it into a video signal and outputs the resultant signal to the display unit 8 to be displayed. Thereafter, the map drawing unit 5A returns to step S10. As long as no operation is made by the user, the map drawing unit 5A repeats the same processing as above.

In the same manner as the north-up display mode, the map image of the desired scale S displayed in the heading-up display mode has the road names of the first hierarchy displayed at the normal size (refer to FIG. 5, numerals 1*a*, 1*b*, 1*c*). Regarding the road names of the first hierarchy, even if the information density of the character layer is high, the number of the road names displayed is limited in order to avoid overlapping the road names, place names, and facility names of the first hierarchy on the map image. As a result, improved legibility of the map image including the roads, rivers, and parks, etc is attained. Being displayed at the normal size, but without overlapping, the legibility of the road names of the first hierarchy is retained. Further, the map image at the desired scale S includes road names of the second hierarchy added thereon at a smaller size (refer to the numerals 2*a*, 2*b*, 2*c*). Therefore, the information density of the road names is enhanced, and more address information can be presented to the user. Here, regarding the road names of the second hierarchy, even if the information density of the character layer is high, improved legibility of the map image including the roads, rivers, and parks and so forth is provided, since the number of the road names displayed is limited in order not to overlap with the other road names, place names, and facility names of the first and second hierarchies on the map image and in order not to duplicate the same road names as those of the first hierarchy, and the road names are displayed in a smaller size. In addition, the place names and facility names do not interfere with the road names of the first and second hierarchies.

Figure 8C:
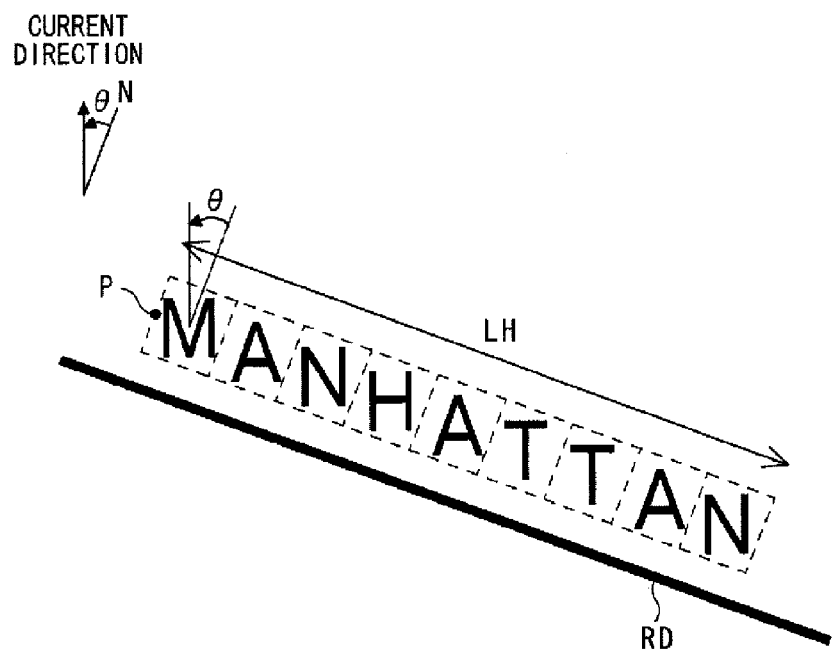
Figure 9A:
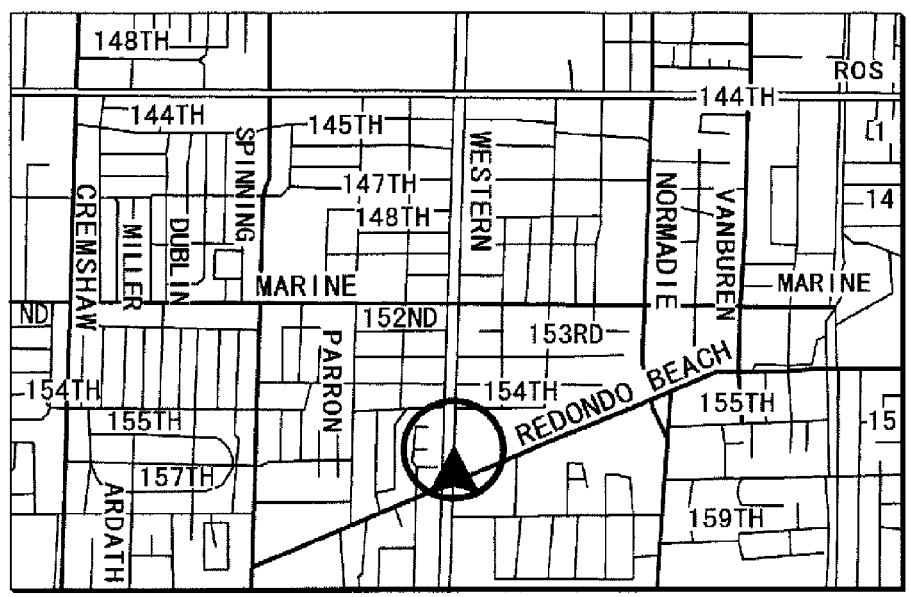
FIG. 9A and FIG. 9B illustrates problems of the conventional method of displaying road names.
Figure 9B:
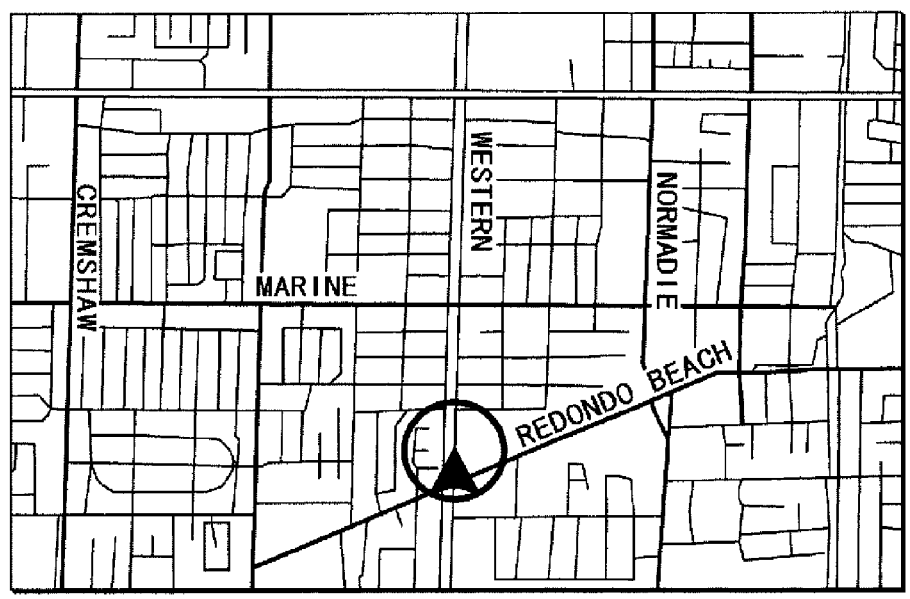

Now, in the case of drawing the road names of the first and second hierarchies in the heading-up display mode, instead of using the normal character pattern, by using the character pattern of a size corresponding to a current azimuth of the vehicle measured clockwise with respect to the north as the reference direction, the road names can be displayed along the corresponding roads as shown in FIG. 8(*c*), which facilitates legibility. In this case, since the character pattern is rotated, the road names are slightly elongated, and the road names slightly tend more to overlap with other road names, place names, and facility names, compared to the case in the north-up display mode. However, since the number of the road names displayed is limited in order to avoid overlapping with other road names, place names, and facility names on the map image, the legibility of the map image itself including the roads, rivers, and parks is retained.

If all of the road names of the first hierarchy corresponding to the desired scale level are displayed, the map image will be filled with road names especially in city areas where the information density of the road name characters in the character layer is high, and legibility will decrease. To avoid this, the present invention avoids drawing the road names that overlap with other road names, place names, and facility names of the first hierarchy on the map image, to limit the number of the road names on the image and result in enhanced legibility. Further, the invention additionally extracts, from the road names of the second hierarchy more detailed by one step than the first hierarchy, the road names that do not overlap with the other road names, place names, and facility names of the first and second hierarchies on the map image and do not duplicate the road names of the first hierarchy on the map image. As a result, the information density of the road names is enhanced, which presents the user with more address information.

Further, since the road names of the first hierarchy are drawn at the normal size, the legibility is retained; on the other hand, since the road names of the second hierarchy are drawn with a smaller character size, the legibility of the map image is maintained.

According to the invention, the road names of the first and second hierarchies do not overlap with other road names, place names, and facility names on the map image, leading to improved legibility.

Since the road names of the second hierarchy more detailed by one step than the first hierarchy are additionally drawn, even when the information density of the road names of the character layer in the suburbs or the like is low and the number of the road names of the first hierarchy displayed is small, the information density of the road names is enhanced, and the address information presented to the user is increased.

Also, when the one step expansion operation is made through the operating unit, the road names displayed at a smaller character size on the image before the expansion operation are displayed at the normal character size at the same positions relative to the roads on the map image having the scale expanded by one step. On the other hand, when the one step reduction operation is made through the operating unit, the road names displayed at the normal character size on the image before the reduction operation are displayed with a smaller character size at the same positions relative to the roads on the map image having the scale reduced by one step. Therefore, since road names are displayed at the same positions on the map image regardless of a scale changing operation, map perception in a new scale can be facilitated by the road name correspondence before and after the scale changing operation.

In the above embodiment, regarding the road names of the first hierarchy corresponding to the desired scale level, the number of the road names displayed is limited by not drawing the road names that overlap with other road names, place names, and facility names of the first hierarchy on the map image; or, if they overlap, the number of the road names displayed may be limited by avoiding drawing the other road names of the first hierarchy on the map image.

Regarding the road names of the second hierarchy, the road names that overlap with the road names of the first hierarchy on the map image are not drawn, or they may be drawn with transparent characters, which makes both of the names visible.

In the case in which the information density of the road names of the character layer of each layer is low in the suburbs or the like, it is possible, without any limitations on the road names of the first and second hierarchies, to draw the former road names with the normal character size and the latter road names with a smaller character size. It is also possible to draw the road names of the first hierarchy at the normal character size without any limitations, and to draw the road names of the second hierarchy at a smaller character size except for the road names duplicating those of the first hierarchy on the map image. In these cases, if the road names of the first and the second hierarchy overlap, either one of them may be drawn with transparent characters, which makes both of the names visible.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A map display method using map data that is provided for each of a plurality of hierarchies corresponding to a plurality of scales and which comprises map character data including road names, for generating and displaying a map image with map characters including the road names at a desired scale, comprising:
    drawing the map image with the map characters, including road names of a predetermined character size of a first hierarchy corresponding to the desired scale, by using the map data of the first hierarchy of the plurality of hierarchies;
    adding road names of a second hierarchy of the plurality of hierarchies at a smaller character size than the road names of the first hierarchy on the map image, by using the map character data of the second hierarchy, which is at a scale larger by one step than the first hierarchy, wherein the map image simultaneously displays road names having a character size defined by the first hierarchy and road names having a smaller character size defined by the second hierarchy;
    wherein drawing a road name of the second hierarchy is avoided if the road name of the second hierarchy overlaps with any road name of the first hierarchy on the map image; and
    wherein if a road a of the first hierarchy overlaps on the may image with a map character other than the road names of the first hierarchy, the road name of the first hierarchy is not drawn, and if a road name of the second hierarchy overlaps on the map image with a map character other than the road names of the first hierarchy, the road name of the second hierarchy is not drawn.

2. The map display method according to claim 1, wherein the method:
    avoids drawing a road name of the first hierarchy if it overlaps with other road names of the first hierarchy on the map image; and
    avoids drawing a road name of the second hierarchy if it overlaps with the other road names of the second hierarchy on the map image.

3. The map display method according to claim 1, wherein one of the overlapping parts where road names of the first and second hierarchies overlap is superimposed on the other with transparent characters.

4. The map display method according to claim 1, wherein the method avoids drawing a road name of the second hierarchy if the road name of the second hierarchy duplicates a road name of the first hierarchy.

5. The map display method according to claim 1, further comprising:
    including one or more other items including place names or facility names within the map character data of each hierarchy.

6. The map display method according to claim 5, wherein, when drawing the map image by rotating the upward direction by a given angle with respect to a predetermined reference direction, the map characters of at least some of the items other than the road names of the first hierarchy are drawn laterally.

7. The map display method according to claim 5, wherein, when drawing the map image by rotating the upward direction by a given angle with respect to a predetermined reference direction, the road names of the first and second hierarchies are drawn by rotating the normal character patterns by the given angle.

8. A map display device that displays a map image surrounding a vehicle position, comprising:
    a map data storage unit storing map data that is provided for each of a plurality of hierarchies corresponding to a plurality of scales and which comprises map character data including road names;
    a map drawing controlling means that generates a map image with map characters including the road names at a desired scale by using the map data and displays it on a display means,
    wherein the map drawing controlling means draws the map image with the map characters including road names of a predetermined character size of a first hierarchy of the plurality of hierarchies corresponding to a desired scale, by using the map data of the first hierarchy, and adds to the map image, road names of a second hierarchy of the plurality of hierarchies at a smaller character size than the road names of the first hierarchy, by using the map character data of the second hierarchy, which is at a scale larger by one step than the first hierarchy, wherein the map image simultaneously displays road names having a character size defined by the first hierarchy and road names having a smaller character size defined by the second hierarchy;
    wherein, drawing the road name of the second hierarchy is avoided if a road name of the second hierarchy overlaps with road names of the first hierarchy on the map image; and
    wherein if a road name of the first hierarchy overlaps on the map image with a map character other than the road names of the first hierarchy, the map drawing controlling means avoids drawing the road name, and if a road name of the second hierarchy overlaps on the map image with a map character other than the road names of the first hierarchy, the map drawing controlling means avoids drawing the road name.

9. The map display device according to claim 8, wherein:
if a road name of the first hierarchy overlaps with other road names of the first hierarchy on the map image, the map drawing controlling means avoids drawing the road name; and
if a road name of the second hierarchy overlaps with other road names of the second hierarchy on the map image, the map drawing controlling means avoids drawing the road name.

10. The map display device according to claim 8, wherein, if a road name of the second hierarchy overlaps with road names of the first hierarchy on the map image, the map drawing controlling means avoids drawing the road name of the second hierarchy.

11. The map display device according to claim 8, wherein the map drawing controlling means draws one of the parts where road names of the first and second hierarchies overlap with transparent characters.

12. The map display device according to claim 8, wherein, if there is a road name of the second hierarchy on the map image that duplicates a road name of the first hierarchy, the map drawing controlling means avoids drawing the road name of the second hierarchy.

13. The map display device according to claim 8, wherein the map character data of each hierarchy comprises one or more other items including place names or facility names.

14. The map display device according to claim 13, wherein, when drawing the map image by rotating the upward direction by a given angle with respect to a predetermined reference direction, the map drawing controlling means draws the map characters of at least some of the items other than the road names of the first hierarchy laterally.

15. The map display device according to claim 13, wherein, when drawing the map image by rotating the upward direction by a given angle with respect to a predetermined reference direction, the map drawing controlling means draws the road names of the first and second hierarchies by rotating the normal character patterns by the given angle.

16. The map display method according to claim 1, comprising changing the desired scale to a next larger scale and setting the second hierarchy to become a new first hierarchy and setting a hierarchy which is one step more detailed than the new first hierarchy to a new second hierarchy, and generating and displaying a new map image with new map characters including road names at the next larger scale, comprising:
drawing the new map image with the new map characters, including road names of a predetermined character size of the new first hierarchy corresponding to the nest larger scale, by using map data of the new first hierarchy of the plurality of hierarchies; and
adding road names of the new second hierarchy of the plurality of hierarchies at a smaller character size than the road names of the new first hierarchy on the new map image, by using the new map character data of the new second hierarchy, which is at a scale larger by one step than the new first hierarchy, wherein the map image simultaneously displays road names having a character size defined by the new first hierarchy and road names having a smaller character size defined by the new second hierarchy.

17. A map display method using map data that is provided for each of a plurality of hierarchies corresponding to a plurality of scales and which comprises map character data including road names, for generating and displaying a map image with map characters including the road names at a desired scale, comprising:
drawing the map image with the map characters, including road names of a predetermined character size of a first hierarchy corresponding to the desired scale, by using the map data of the first hierarchy of the plurality of hierarchies;
adding road names of a second hierarchy of the plurality of hierarchies at a smaller character size than the road names of the first hierarchy on the map image, by using the map character data of the second hierarchy, which is at a scale larger by one step than the first hierarchy, wherein the map image simultaneously displays road names having a character size defined by the first hierarchy and road names having a smaller character size defined by the second hierarchy;
wherein drawing a road name of the second hierarchy is avoided if the road name of the second hierarchy overlaps with any road name of the first hierarchy on the map image; and
wherein one of the overlapping parts where road names of the first and second hierarchies overlap is superimposed on the other with transparent characters.

18. A map display device that displays a map image surrounding a vehicle position, comprising:
a map data storage unit storing map data that is provided for each of a plurality of hierarchies corresponding to a plurality of scales and which comprises map character data including road names;
a map drawing controlling means that generates a map image with map characters including the road names at a desired scale by using the map data and displays it on a display means,
wherein the map drawing controlling means draws the map image with the map characters including road names of a predetermined character size of a first hierarchy of the plurality of hierarchies corresponding to a desired scale, by using the map data of the first hierarchy, and adds to the map image, road names of a second hierarchy of the plurality of hierarchies at a smaller character size than the road names of the first hierarchy, by using the map character data of the second hierarchy, which is at a scale larger by one step than the first hierarchy, wherein the map image simultaneously displays road names having a character size defined by the first hierarchy and road names having a smaller character size defined by the second hierarchy;
wherein, drawing the road name of the second hierarchy is avoided if a road name of the second hierarchy overlaps with road names of the first hierarchy on the map image; and
wherein the map drawing controlling means draws one of the parts where road names of the first and second hierarchies overlap with transparent characters.

* * * * *

UNITED STATES PATENT AND TRADEMARK OFFICE
CERTIFICATE OF CORRECTION

PATENT NO.       : 8,781,734 B2                                   Page 1 of 1
APPLICATION NO.  : 12/124856
DATED            : July 15, 2014
INVENTOR(S)      : Noboru Yamazaki It is certified that error appears in the above-identified patent and that said Letters Patent is hereby corrected as shown below:

In the Claims

Column 11, claim 1, line 59, after "wherein if a road" replace "a" with --name--.

Column 11, claim 1, line 59, after "overlaps on the" replace "may" with --map--.

Signed and Sealed this
Twenty-fourth Day of February, 2015

Michelle K. Lee
*Deputy Director of the United States Patent and Trademark Office*